United States Patent
Karime et al.

(10) Patent No.: US 11,395,981 B2
(45) Date of Patent: Jul. 26, 2022

(54) SYSTEMS AND METHODS FOR OPTIMIZING THE PERFORMANCE OF OLEFIN PLANT QUENCH WATER SEPARATORS

(71) Applicant: SABIC Global Technologies B.V., Bergen op Zoom (NL)

(72) Inventors: Mustapha N. Karime, Riyadh (SA); Ananth Sharma, Bangalore (IN)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 19 days.

(21) Appl. No.: 16/647,941

(22) PCT Filed: Oct. 22, 2018

(86) PCT No.: PCT/IB2018/058221
§ 371 (c)(1),
(2) Date: Mar. 17, 2020

(87) PCT Pub. No.: WO2019/082062
PCT Pub. Date: May 2, 2019

(65) Prior Publication Data
US 2020/0282333 A1    Sep. 10, 2020

Related U.S. Application Data (60) Provisional application No. 62/577,045, filed on Oct. 25, 2017, provisional application No. 62/576,522, filed on Oct. 24, 2017.

(51) Int. Cl.
*B01D 17/02*     (2006.01)
*B01D 21/00*     (2006.01)
(Continued)

(52) U.S. Cl.
CPC ...... *B01D 17/0211* (2013.01); *B01D 21/0042* (2013.01); *B01J 6/008* (2013.01);
(Continued)

(58) Field of Classification Search
None
See application file for complete search history.

(56) References Cited

U.S. PATENT DOCUMENTS 2,945,807 A    7/1960   Farnham
3,923,659 A    12/1975  Ullrich
(Continued)

FOREIGN PATENT DOCUMENTS

CN    206543433 U       10/2017
GB      2101494 A   *   1/1983   ......... B01D 21/2416
(Continued)

OTHER PUBLICATIONS

Hussein et al., "Numerical Model of Baffle Location Effect on Flow Pattern in Oil and Water Gravity Separator Tanks", World Applied Sciences Journal 26 (1), 2013, pp. 1351-1356. (Year: 2013).*
(Continued)

*Primary Examiner* — Philip Y Louie
(74) *Attorney, Agent, or Firm* — Norton Rose Fulbright US LLP (57) ABSTRACT

Systems and methods of removing coke/tar from water in a quench water recycling loop of a steam cracker quench system are disclosed. The systems include a quench water separator that has a feed calming compartment for reducing eddies in feed to the quench water separator. The feed calming compartment is defined, at least in part, by a perforated baffle in the quench water separator. The methods include the use of the quench water separator with the
(Continued)

perforated baffle and the calming compartment to separate coke/tar from quench water in the quench water recycling loop.

20 Claims, 7 Drawing Sheets (51) Int. Cl.
 B01J 6/00 (2006.01)
 C10G 31/00 (2006.01)
(52) U.S. Cl.
 CPC ....... *C10G 31/00* (2013.01); *C10G 2300/201* (2013.01); *C10G 2400/02* (2013.01)

(56) References Cited

U.S. PATENT DOCUMENTS

| | | | |
|---|---|---|---|
| 4,037,288 | A | 7/1977 | Meyer |
| 5,569,434 | A | 10/1996 | Devanathan et al. |
| 6,764,598 | B2 | 7/2004 | Yu et al. |
| 8,470,080 | B1 * | 6/2013 | Ball, IV ............. B01D 21/2405 95/253 |
| 2002/0153310 | A1 | 10/2002 | Kurukchi et al. |
| 2003/0150324 | A1 * | 8/2003 | West .................. B01D 17/0211 95/268 |
| 2007/0271324 | A1 | 11/2007 | Beyk |
| 2008/0031476 | A1 | 2/2008 | Wang et al. |
| 2008/0128323 | A1 | 6/2008 | McCoy et al. |
| 2010/0230235 | A1 | 9/2010 | Strack et al. |
| 2017/0319984 | A1 * | 11/2017 | Oshinowo .............. B01D 17/12 |

FOREIGN PATENT DOCUMENTS

| | | |
|---|---|---|
| GB | 0605933 | 5/2006 |
| GB | 2436303 A | 9/2007 |
| JP | 2003010602 A | 1/2003 |

OTHER PUBLICATIONS

Multiphase Separators. Product Leaflet. http://www.frames-group.com/Products/Multiphase-Separation. 4 pages. Copy obtained May 26, 2016.
International Search Report and Written Opinion from PCT/IB2018/058221 dated Feb. 19, 2019, 12 pages.
Frames) "Multiphase Separation"; webpage https://web.archive.org/web/20170927155935/http://www.Frames-group.com/Products/Multiphase-Separation; as saved by Archive.org on May 26, 2016, 9 pages.
Kirk Process Solution "K-Sep Separator Internals"; webpage https://web.archive.org/web/20170518233250/http://www.Kirkprocess.com/products/k-sep-separator-internals/; as saved by Archive.org on May 17, 2017, 2 pages.
Extended European Search Report from European Application No. 18871668.2 dated Jul. 1, 2021, 7 pages.

* cited by examiner

SYSTEMS AND METHODS FOR OPTIMIZING THE PERFORMANCE OF OLEFIN PLANT QUENCH WATER SEPARATORS

CROSS REFERENCE TO RELATED APPLICATIONS

This application is a national phase application under 35 U.S.C. § 371 of International Application No. PCT/IB2018/058221 filed Oct. 22, 2018, which claims priority to U.S. Provisional Patent Application No. 62/576,522 filed Oct. 24, 2017 and to U.S. Provisional Patent Application No. 62/577,045 filed Oct. 25, 2017. The entire contents of each of the above-referenced disclosures is specifically incorporated by reference herein without disclaimer.

FIELD OF INVENTION

The present invention relates to steam cracker quench systems. More specifically, the present invention relates to improving the settling ability of quench water separators in steam cracker quench systems.

BACKGROUND OF THE INVENTION

Steam crackers are used to produce certain hydrocarbons, e.g., ethylene, by steam cracking hydrocarbon feedstocks such as naphtha, ethane, and propane. In the steam cracking (pyrolysis) process, the hydrocarbons are superheated in a reactor to temperatures as high as 750-950° C. For the cracking process, a dilution steam generator (DSG) supplies dilution steam to the reactor to reduce the partial pressure of the hydrocarbons. The superheated hydrocarbons are then rapidly cooled (quenched) to stop the reactions after a certain point to optimize cracking product yield. The quenching of the superheated gas in many processes is carried out using water in a quench water tower (QWT). The superheated cracked gas is flowed into the bottom of the quench water tower and, at the same time, water is sprayed into the top of the quench water tower. As the water in the quench water tower falls, it makes contact with the upwardly flowing superheated cracked gas and, in that way, cools the superheated cracked gas and dilution steam.

Because of the direct contact between the superheated cracked gas in the quench water tower and the condensation of the dilution steam, the water flowing from the quench water tower is mixed with condensed hydrocarbons (referred to as pyrolysis gasoline). Pyrolysis gasoline may include components such as aromatics, olefins, and/or diolefins, among others.

To facilitate the separation of the water from the pyrolysis gasoline, the quench water tower effluent stream is flowed from the quench water tower to a quench water separator (QWS). At the quench water separator, the quench water effluent stream is settled and water is drawn off from the quench water separator. Then, the water from the quench water separator is sent to a process water stripper (PWS). The process water stripper strips the water of acid gases and dissolved hydrocarbons. After being stripped in the process water stripper, the water is routed to the DSG (mentioned above). The water that is used to generate a dilution steam for the cracking furnaces, and subsequently condensed in the quench water tower, then circulated to the quench water separator, then to the process water stripper, and finally back to the dilution steam generator is referred to as process water, which circulates in a quench water tower loop. The quench water tower, quench water separator, process water stripper, and dilution steam generator are collectively referred to as the dilution steam system (DSS) or quench system.

The olefin plant quench water separator plays a vital role in the quench section performance. As noted above, the quench tower bottom stream, consisting mainly of water and heavy hydrocarbons, is fed to the quench water separator, where it gets separated into quench water recycle, process condensate, and gasoline streams. Some conventional quench water separators are divided into four compartments by means of three internal baffles, namely a coke retention baffle, a perforated baffle, and a spillover baffle. The quench water recycle stream is withdrawn from the compartment between coke retention and perforated baffles, the process condensate stream is withdrawn from the compartment between the perforated and spillover baffle, and the gasoline stream is withdrawn from the compartment downstream of the spillover baffle. The pytar/coke stream is withdrawn upstream of the coke retention baffle.

Quench water recycle is fed back to the top of the quench tower after rejecting its heat content to the downstream heat exchangers. Process condensate is cleaned up in the downstream dispersed oil extraction (DOX) and process condensate stripper units and gets heated up along with the incoming feedstock to the pyrolysis furnace feed temperature in the ethane and butane feedstock superheaters. Gasoline is cleaned up in the fuel oil stripper. Fuel oil stripper overhead is recycled back to the quench tower and the bottom stream is sent to the waste oil drum for disposal. Heavies (pytar and coke/tar fines) are purged out of the quench water separator in a batch-wise manner and sent to the waste oil drum for disposal.

In one situation in which the height of the coke retention baffle was reduced in order to reduce turbulence and improve oil/water separation, a high pressure drop occurred in the DOX unit. Also, in this situation, aggressive furnace steam water decoking was pursued, which improved furnace run length, but caused additional coke/tar to reach the quench water separator. Improvements in the capabilities of quench water separators are desired so as to be able to handle situations like this in which relatively large quantities of coke/tar are fed to the quench water separator.

BRIEF SUMMARY OF THE INVENTION

A method has been discovered for optimizing the performance of quench water separators. The method includes providing a calming baffle in the quench water separator to help the pytar/coke material settle faster.

Embodiments of the invention include a quench water separator that comprises a feed calming compartment. The feed calming compartment is adapted to receive feed flowing into the quench water separator and to reduce eddies in the feed. The feed calming compartment extends from one end of the shell to a perforated baffle. The perforated baffle extends across at least a third of the internal cross-sectional area of the shell. The quench water tower further includes a tar drainage compartment adapted to separate coke/tar from fluid flowing into the tar drainage compartment from the feed calming compartment. The feed calming compartment is separated from the tar drainage compartment by the perforated baffle.

Embodiments of the invention include a method of separating coke/tar from water in a quench water recycling loop. The method includes receiving furnace effluent in a quench tower and quenching the furnace effluent in the quench tower with quench water to produce at least a bottom stream comprising pyrolysis gasoline. The method further includes settling the bottom stream comprising pyrolysis gasoline in a quench water separator. The quench water separator comprises a feed calming compartment. The feed calming compartment is adapted to receive feed flowing into the quench water separator and to reduce eddies in the feed. The feed calming compartment extends from one end of the shell to a perforated baffle. The perforated baffle extends across at least a third of the internal cross-sectional area of the shell. The quench water tower further includes a tar drainage compartment adapted to separate coke/tar from fluid flowing into the tar drainage compartment from the feed calming compartment. The feed calming compartment is separated from the tar drainage compartment by the perforated baffle.

The following includes definitions of various terms and phrases used throughout this specification.

The terms "about" or "approximately" are defined as being close to as understood by one of ordinary skill in the art. In one non-limiting embodiment the terms are defined to be within 10%, preferably, within 5%, more preferably, within 1%, and most preferably, within 0.5%.

The terms "wt. %", "vol. %" or "mol. %" refers to a weight, volume, or molar percentage of a component, respectively, based on the total weight, the total volume, or the total moles of material that includes the component. In a non-limiting example, 10 moles of component in 100 moles of the material is 10 mol. % of component.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification, includes any measurable decrease or complete inhibition to achieve a desired result.

The term "effective," as that term is used in the specification and/or claims, means adequate to accomplish a desired, expected, or intended result.

The use of the words "a" or "an" when used in conjunction with the term "comprising," "including," "containing," or "having" in the claims or the specification may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The process of the present invention can "comprise," "consist essentially of," or "consist of" particular ingredients, components, compositions, etc., disclosed throughout the specification.

In the context of the present invention, embodiments 1-17 are described. Embodiment 1 is a quench water separator comprising a shell, a feed calming compartment adapted to receive feed flowing into the quench water separator and to reduce eddies in the feed and extending from one end of the shell to a calming perforated baffle, which extends across at least a third of the internal cross-sectional area of the shell, and a tar drainage compartment adapted to separate coke/tar from fluid flowing into the tar drainage compartment from the feed calming compartment, where the feed calming compartment is separated from the tar drainage compartment by the calming perforated baffle. Embodiment 2 is the quench water separator of embodiment 1, including a quench water compartment adapted to separate quench water from fluid flowing into the quench water compartment from the tar drainage compartment, where the tar drainage compartment is separated from the quench water compartment by a coke retention baffle. Embodiment 3 is the quench water separator of embodiment 2, further including a process condensate compartment adapted to separate process condensate from fluid flowing into the process condensate compartment from the quench water compartment, where the quench water compartment is separated from the process condensate compartment by a perforated baffle. Embodiment 4 is the quench water separator of embodiment 3, further including a pyrolysis gasoline compartment adapted to separate pyrolysis gasoline from fluid flowing into the pyrolysis gasoline compartment from the process condensate compartment, where the pyrolysis gasoline compartment is separated from the process condensate compartment by a spillover baffle. Embodiment 5 is the quench water separator of any of embodiments 1 to 4, wherein at least the lower 1/10th of the calming perforated baffle has no perforations. Embodiment 6 is the quench water separator of any of embodiments 1 to 5, further including a boot leading from the feed calming compartment for collecting coke/tar material. Embodiment 7 is the quench water separator of any of embodiments 1 to 6, wherein the calming perforated baffle comprises holes and overhangs leading from the holes. Embodiment 8 is the quench water separator of embodiment 7, wherein the holes comprise holes having a diameter in a range of 25 to 30 mm. Embodiment 9 is the quench water separator of embodiment 7, wherein the holes comprise holes that are rectangular and have a length in a range of 200 mm to 700 mm and a width in a range of 50 mm to 200 mm. Embodiment 10 is the quench water separator of any of embodiments 7 to 9, wherein the area of the holes is 30% to 50% of the total area of the calming perforated baffle. Embodiment 11 is the quench water separator of any of embodiments 1 to 10, wherein the ratio of internal diameter of the quench water separator/height of the calming perforated baffle is in a range of 1.5/1 to 2.5/1. Embodiment 12 is the quench water separator of any of embodiments 1 to 11, wherein the calming perforated baffle is located at distance "x" from a corner of the quench water separator that is closest to a feed inlet and ratio of the length of the quench water separator $10$ ("l")/"x" is between 65/2.5 to 65/3.5.

Embodiment 13 is a method of separating coke/tar from quench water in a quench water recycling loop. The method includes receiving furnace effluent in a quench tower, quenching the furnace effluent in the quench tower with quench water to produce a bottom stream comprising pyrolysis gasoline, and settling the bottom stream comprising pyrolysis gasoline in a quench water separator. The quench water separator includes a shell, a feed calming compartment adapted to receive feed flowing into the quench water separator and to reduce eddies in the feed. The feed calming compartment extends from one end of the shell to a calming perforated baffle, which extends across at least a third of the internal cross-sectional area of the shell. The quench water separator also includes a tar drainage compartment adapted to separate coke/tar from fluid flowing into the tar drainage compartment from the feed calming compartment. The feed calming compartment is separated from the tar drainage compartment by the calming perforated baffle. Embodiment 14 is the method of embodiment 13, wherein at least the lower 1/10th of the calming perforated baffle has no perforations. Embodiment 15 is the method of embodiments 13 or 14, further including flowing coke/tar from the quench water separator via a boot leading from the feed calming compartment. Embodiment 16 is the method of any of embodiments 13 to 15, wherein the calming perforated baffle comprises holes with overhangs leading from the holes. Embodiment 17 is the method of any of embodiments 13 to 16, wherein the area of the holes is 30% to 50% of the total area of the calming perforated baffle. Embodiment 18 is the method of any of embodiments 13 to 17, wherein the ratio of internal diameter of the quench water separator/height of the calming perforated baffle is in the range 1.5/1 to 2.5/1.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

For a more complete understanding, reference is now made to the following descriptions taken in conjunction with the accompanying drawings, in which.

DETAILED DESCRIPTION OF THE INVENTION

A method has been discovered for optimizing the performance of quench water separators. The method includes providing a calming baffle in the quench water separator to help the pytar/coke material settle faster. In this way, embodiments of the invention improve oil/water separation and eliminate or at least minimize pytar/coke fouling material in the stream from the quench water separator that is routed back to the quench water column.

Figure 1:
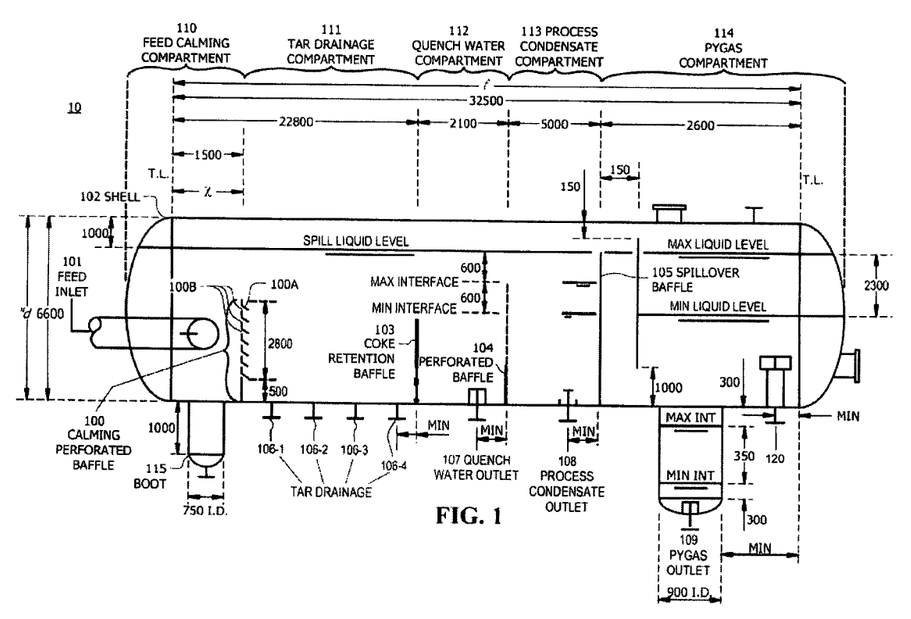
FIG. 1 shows a quench water separator, according to embodiments of the invention.
Figure 2:
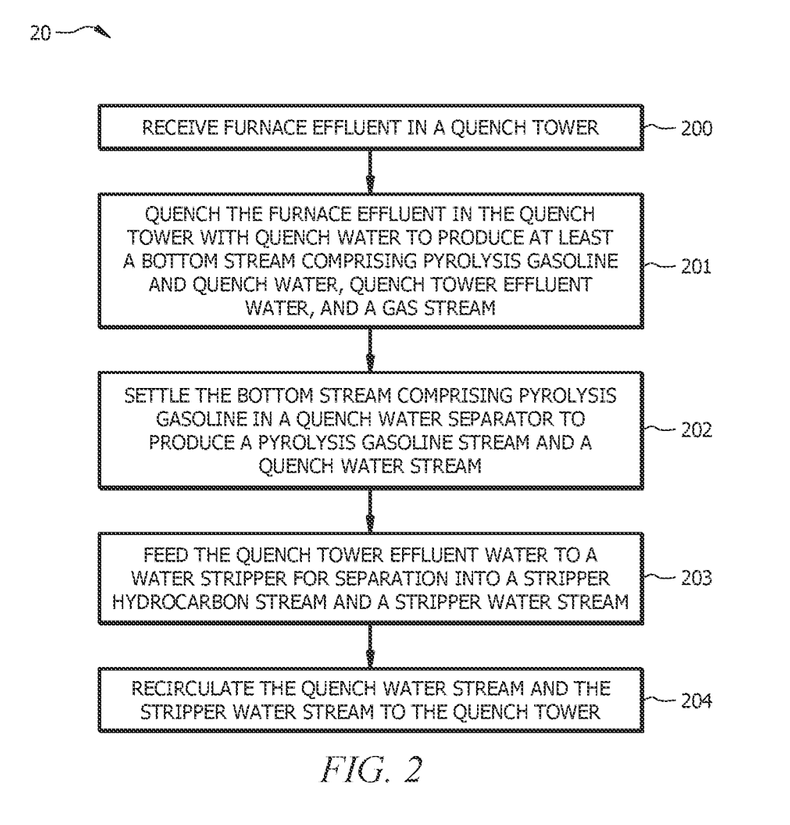
FIG. 2 shows a method of separating coke/tar from quench water in a quench water recycling loop, according to embodiments of the invention.

FIG. 1 shows quench water separator 10, according to embodiments of the invention. FIG. 2 shows method 20 for separating quench water, according to embodiments of the invention. Method 20 may be implemented by using quench water separator 10.

According to embodiments of the invention, and as shown in FIG. 1, calming perforated baffle 100 is provided near feed inlet 101 of quench water separator 10. Calming perforated baffle 100 is adapted to reduce the amount of eddies, if present, in feed as it flows through feed inlet 101 into shell 102. Calming perforated baffle 100 is adapted to provide some time for pytar/coke material to settle. In embodiments of the invention, the size of perforations or holes 100B can have a diameter in a range of 25 to 30 mm and/or holes 100B can be rectangular with a length in a range of 200 mm to 700 mm and a width in a range of 50 mm to 200 mm (200 mm-700 mm×50 mm-200 mm), preferably 500 mm×125 mm. In embodiments of the invention, the total perforated/open area of the baffle can be in a range of 30 to 50% of the total area of the baffle. Holes 100B can have any shape, e.g., circular or rectangular, with or without an awning or overhang 100A leading from holes 100B, as shown in FIG. 1. According to embodiments of the invention, calming perforated baffle 100 may have holes 100B with overhang 100A, without any overhang, or both.

In embodiments of the invention, overhang 100A is slanted at a 45° angle from the horizontal plane, or anywhere between 5° and 85° from the horizontal plane. The slanted overhang can help the pytar/coke material to settle faster. The lower 20% or thereabout of calming perforated baffle 100 may be solid with no holes. For example, as shown in FIG. 1, for a 3000 mm baffle as shown, the lower 500 mm of calming perforated baffle 100 is solid with no holes to help keeping the pytar/coke material behind the calming perforated baffle. According to embodiments of the invention, boot 115 can also be installed next to calming perforated baffle 100 to help collect pytar/coke material and prevent such pytar/coke material from re-dispersing and scattering again behind the calming baffle in case of unexpected turbulence due to water feed vigorously gushing into shell 102 of quench water separator 10.

According to embodiments of the invention, quench water separator 10 has shell 102 and a plurality of baffles disposed in shell 102, namely calming perforated baffle 100, coke retention baffle 103, perforated baffle 104, and spill over baffle 105. In embodiments of the invention, quench water separator 10 includes feed calming compartment 110, tar drainage compartment 111, quench water compartment 112, process condensate compartment 113, and pyrolysis gasoline (pygas) compartment 114. In embodiments of the invention, calming perforated baffle 100 and the vertical plane in which it is located separates feed calming compartment 110 from tar drainage compartment 111. In embodiments of the invention, coke retention baffle 103 and the vertical plane in which it is located separates tar drainage compartment 111 from quench water compartment 112. In embodiments of the invention, perforated baffle 104 and the vertical plane in which it is located separates quench water compartment 112 from process condensate compartment 113. In embodiments of the invention, spill over baffle 105 and the vertical plane in which it is located separates process condensate compartment 113 from pyrolysis gasoline compartment 114.

In embodiments of the invention, the ratio of length of quench water separator 10 ("l") to the height of calming perforated baffle 100 may be in the range 65/8 to 65/5, preferably 65/6.6 or thereabout. In embodiments of the invention, the ratio of internal diameter "d" of quench water separator 10 to the height of calming perforated baffle 100 is in the range 1.5/1 to 2.5/1, preferably 2/1 or thereabout. In embodiments of the invention, calming perforated baffle 100 extends across $1/3^{rd}$ to ½ of the internal cross-sectional area of quench water separator 10. Calming perforated baffle 100 may be located at distance "x" from a corner of quench water separator 10 that is closest to feed inlet 101. The ratio of the length of quench water separator 10 ("l")/"x" may be 65/2.5 to 65/3.5, preferably 65/3.0.

According to embodiments of the invention, quench water separator 10 comprises feed calming compartment 110, and one or more of tar drainage compartment 111, quench water compartment 112, process condensate compartment 113, and pyrolysis gasoline compartment 114. In embodiments of the invention, feed calming compartment 110 is adapted to reduce eddies in feed flowing through feed inlet 101 into quench water separator 10. Feed calming compartment 110 extends, in embodiments of the invention, from one end of shell 102 to calming perforated baffle 100. According to embodiments of the invention, feed calming compartment 110 receives feed flowing from feed inlet 101 and is able to reduce eddies, at least in part, by calming perforated baffle 100. Calming perforated baffle 100, in embodiments of the invention, can include an upper portion that is perforated, having holes 100B and a lower portion that is not perforated (e.g, the area of the holes is 30% to 50% of the total area of calming perforated baffle 100). It should be noted that, according to embodiments of the invention, calming perforated baffle 100 can include holes 100B (e.g., holes with diameter in a range of 25 to 30 mm) with overhang 100A. Calming perforated baffle 100 can extend across at least a third of the internal cross-sectional area of shell 102, according to embodiments of the invention. As shown in in FIG. 1, the ratio of the height of perforated area/height of non-perforated area can be 30/5. In embodiments of the invention, the ratio of the height of perforated area/height of non-perforated area can be in the range 30/4 to 30/6. In embodiments of the invention, at least the bottom 1/10th of calming perforated baffle 100 has no perforations.

According to embodiments of the invention, feed calming compartment 110 is further adapted to separate coke/tar from feed flowing into feed calming compartment 110. In embodiments of the invention, quench water separator 10 includes boot 115 leading from feed calming compartment 110 for collecting coke/tar material.

According to embodiments of the invention, quench water separator 10 includes tar drainage compartment 111, which is adapted to separate fluid flowing into tar drainage compartment 111 from feed calming compartment 110. Feed calming compartment 110 can be separated from tar drainage compartment 111 by calming perforated baffle 100. Quench water separator 10 may further include one or more tar drainage outlets 106-1 to 106-4 leading from tar drainage compartment 111 for draining tar/coke from quench water separator 10.

In embodiments of the invention, quench water compartment 112 is adapted to separate quench water from fluid flowing into quench water compartment 112 from tar drainage compartment 111. Tar drainage compartment 111 can be separated from quench water compartment 112 by coke retention baffle 103. Quench water separator 10 may further include quench water outlet 107 leading from quench water compartment 112 for removing quench water from quench water separator 10.

According to embodiments of the invention, process condensate compartment 113 is adapted to separate process condensate from fluid flowing into process condensate compartment 113 from quench water compartment 112. Quench water compartment 112 can be separated from process condensate compartment 113 by perforated baffle 104. Quench water separator 10 may further include process condensate outlet 108 leading from process condensate compartment 113 for removing process condensate from quench water separator 10.

According to embodiments of the invention, pyrolysis gasoline compartment 114 is adapted to separate pyrolysis gasoline from fluid flowing into pyrolysis gasoline compartment 114. Pyrolysis gasoline compartment 114 can be separated from process condensate compartment 113 by spill over baffle 105. Quench water separator 10 may further include pyrolysis gasoline outlet 109 leading from pyrolysis gasoline compartment 114 for removing pyrolysis gasoline from quench water separator 10.

Referring to FIG. 2, embodiments of the invention include method 20, which is a method of separating coke/tar from quench water in a quench water recycling loop. The method may include, at block 200, receiving furnace effluent in a quench tower. Block 201 of method 20 may include quenching the furnace effluent in the quench tower with quench water to produce (1) a bottom stream comprising pyrolysis gasoline and quench water, (2) quench tower effluent water, and (3) a gas stream. After the quenching of block 201, method 20 may include, at block 202, settling the bottom stream comprising pyrolysis gasoline in a quench water separator, such as quench water separator 10 that has a feed calming compartment and a perforated baffle that defines, at least in part, the feed calming compartment.

According to embodiments of the invention, quench water separator 10 is used in method 20 to produce a hydrocarbon stream (pyrolysis gasoline), a quench water stream and one or more tar streams. Block 203 of method 20 may involve feeding the quench tower effluent water to a water stripper for separation into a stripper hydrocarbon stream and a stripper water stream. Then, at block 204, method 20 may include recirculating the quench water stream and the stripper water stream to the quench tower. Block 204 may also include cooling the quench water stream prior to returning it to the quench tower. Further, in method 20, process condensate may be cleaned up in condensate stripper units, after which it is heated and fed to the pyrolysis furnace with incoming feedstock.

Although embodiments of the present invention have been described with reference to blocks of FIG. 2, it should be appreciated that operation of the present invention is not limited to the particular blocks and/or the particular order of the blocks illustrated in FIG. 2. Accordingly, embodiments of the invention may provide functionality as described herein using various blocks in a sequence different than that of FIG. 2.

Computational fluid dynamics (CFD) was used as a tool to get an insight on settling behavior of coke particle as a function of baffle design, spacing and height. A simplified two dimensional model of the entire separator was initially used to screen through various baffle design improvement ideas identified. Based on the modeling results, the most promising design modifications and simulated using a three dimensional CFD model to quantify the benefits. Flow mal-distribution through the inlet T-junction flow distributor was suspected and found to be true based on 3D modeling results. Accordingly, the following three cases were simulated:

Case 1 (original design): Original separator configuration.

Case 2 (Preferred embodiment according to FIG. 1; See also FIGS. 3A and 3B): Calming baffle (Perforated rectangular slot of 500 mm×125 mm) of height 3300 mm placed at 1.5 m from tangent line.

Case uniform: Original design without calming baffles assuming uniform flow distribution through each slots of inlet flow distributor.

Following assumptions were used during development of CFD model:

The flow was assumed to be single phase water and oil phase was not modeled.

Figure 3A:
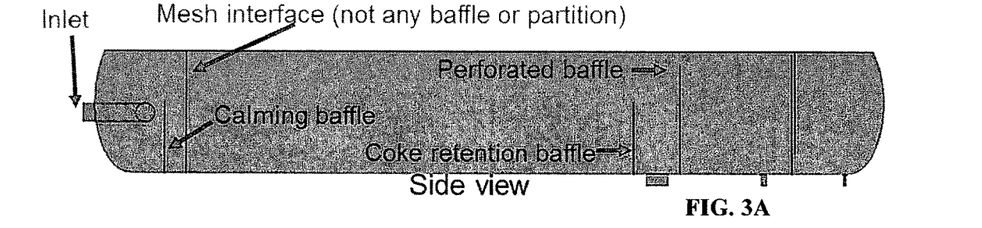
FIGS. 3A and 3B are a side view and an isometric view of a preferred embodiment of the invention.
Figure 3B:
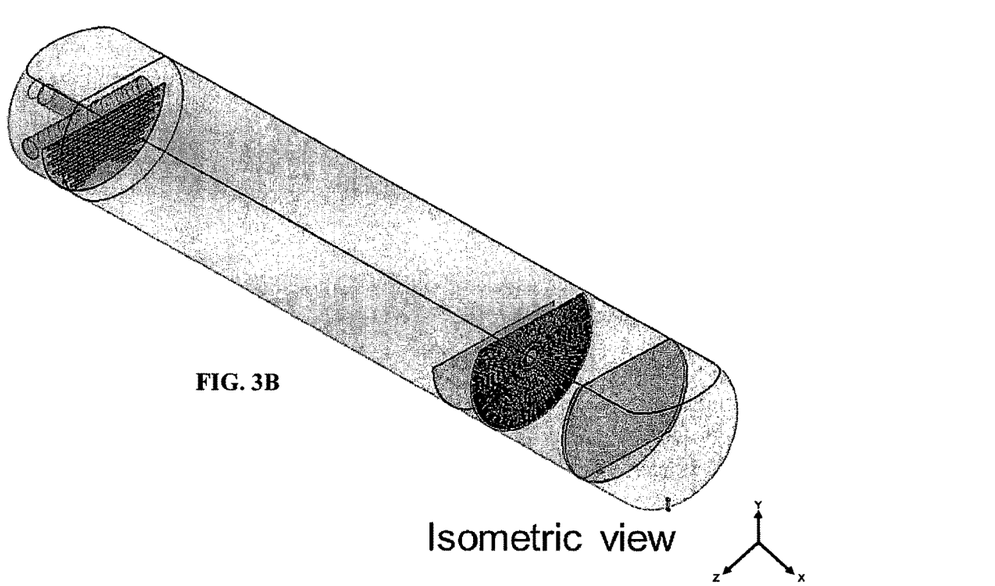
Figure 4A:
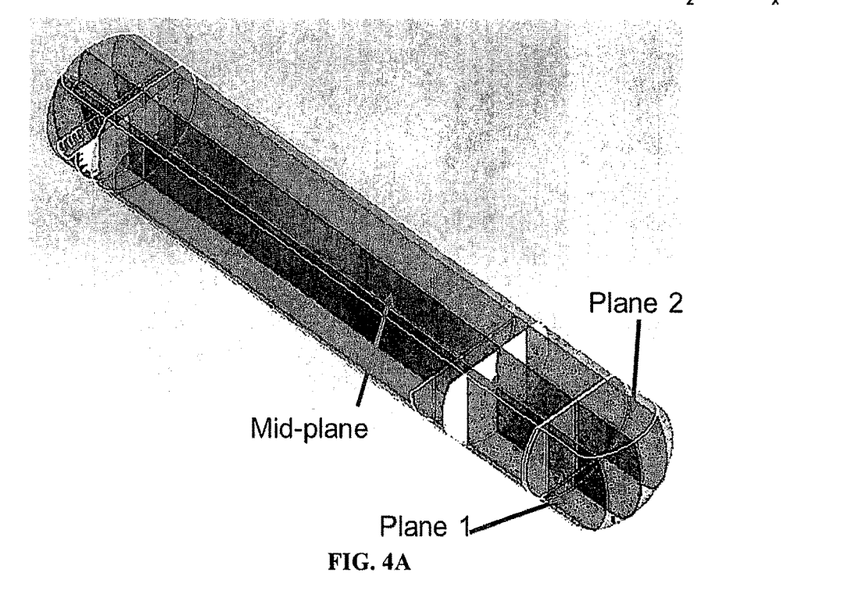
FIGS. 4A and 4B show the location of planes used for contour plots.
Figure 4B:
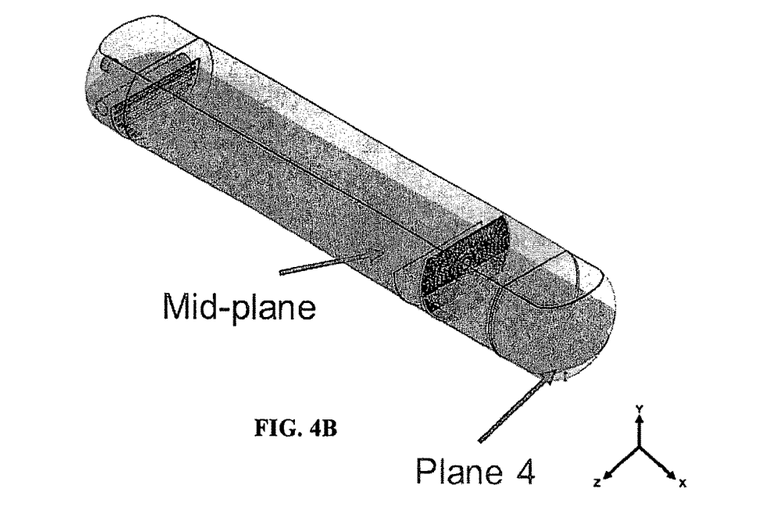

Only the major and continuous nozzles 107, 108 and 120 were modeled according to FIG. 1. FIGS. 3A and 3B also show an embodiment according to the invention. FIGS. 4A and 4B show the location of planes of the embodiment used for contour plots.

Representative settling behavior of coke particles was studied for assumed particle sizes of 150, 100, and 75 mm. Coke particles were assumed to be spherical in shape with density of 1600 kg/m$^3$. Possible settling of heavier particles before the calming baffle was also not considered since boot is not modeled. Re-entrainment of settled particles was also not considered.

Residence time distribution was calculated injecting a pulse input at the inlet and measuring the concentration of disturbance at the outlet nozzle 107 of FIG. 1 using the following formula:

Mean residence time.

$$\bar{t} = \frac{\sum_i t_i C_i}{\Sigma C_i}$$

Introduction of calming baffle was shown to increase the mean residence time by 5% compared to original design.

Figure 5:
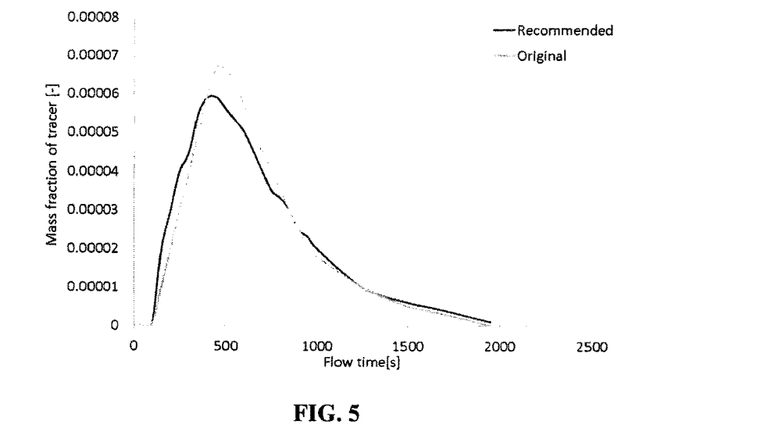
FIG. 5 is a graph of residence time distribution according to the CFD model.

Increase in residence time and reduction of back-mixing is shown to improve particle settling. Results showing residence time distribution are shown graphically in FIG. 5.

Introduction of calming baffles improves settling of larger particles more than smaller ones.

Figure 6:
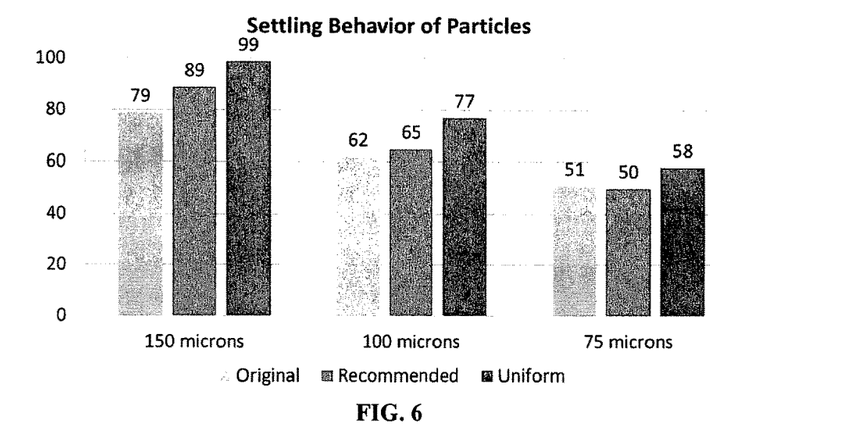
FIG. 6 is a graph showing settling behavior of particles based on CFD modeling.

It should be noted that the settling efficiency for the embodiment of FIG. 1 design could be under-predicted since particle knock down due to calming baffles is not modeled. It should also be noted that settling efficiency for original design could be over-predicted since re-entrainment of settled particles not considered. Uniform flow at inlet distributor significantly improves particle settling for all particles. Settling behavior of particles is shown graphically in FIG. 6.

Figure 7:
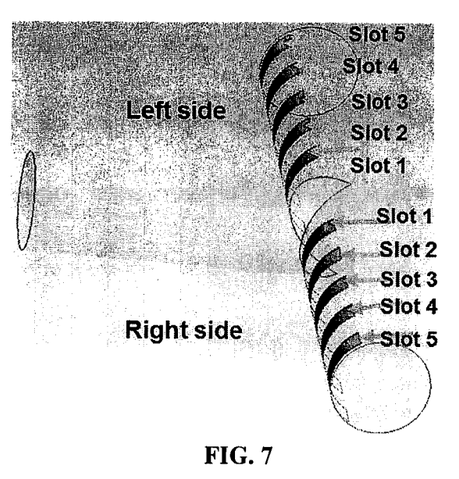
FIG. 7 shows a T-Junction flow inlet according to the invention.
Figure 8:
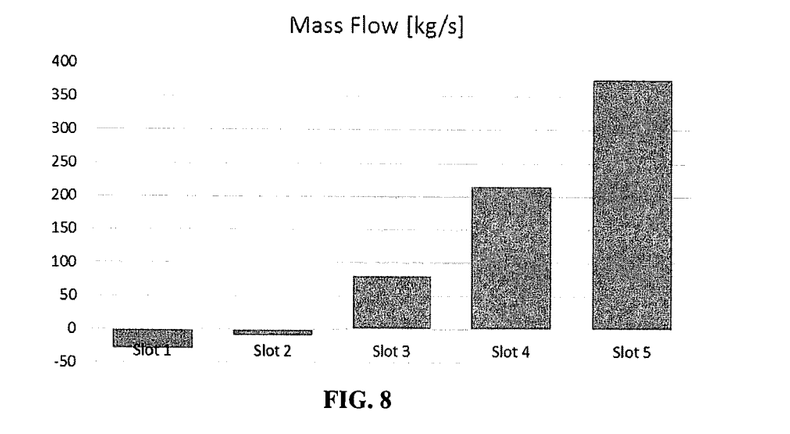
FIG. 8 is a graph of flow distribution to various slots in the inlet distributor according to the CFD model.

FIG. 7 shows a T-junction inlet flow distributor and various slots. FIG. 8 shows the flow distribution to various clots in the inlet distributor shown in FIG. 7. The results show:

Inlet distributor shows a large flow mal-distribution.

The highest flow through slot 5 located at dead end of the distributor. A small amount of flow is actually pulled into slot 1 and slot 2 from the surrounding. Flow is equally distributed between left and right sides of the distributor and hence data for only 5 slots shown in graph. A calming baffle does not influence the flow in the inlet distributor.

Particles being knocked down by the calming baffle were not considered in model and hence would settling efficiency is slightly under-predicted the results show that introduction of calming baffles improves settling of larger particles. Uniform flow at inlet distributor significantly improves particle settling for all particles.

Figure 9:
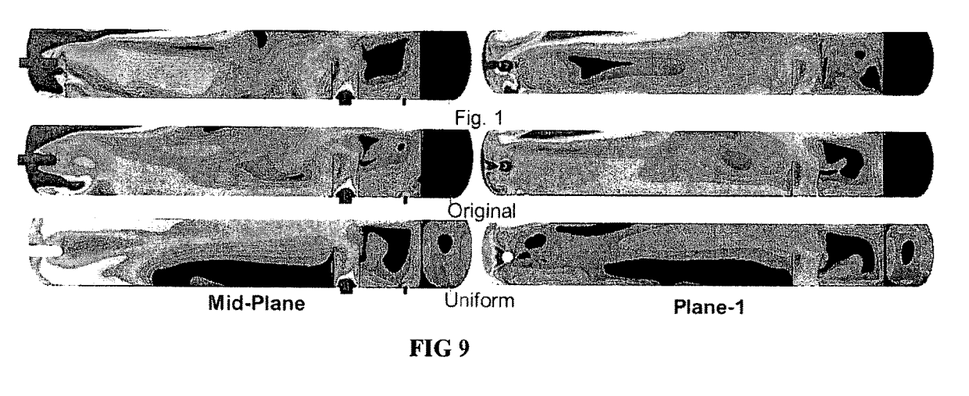
FIG. 9 shows the velocity contour on vertical planes according to the CFD model.

FIG. 9 shows the velocity contour on vertical planes according to the model.

Figure 10:
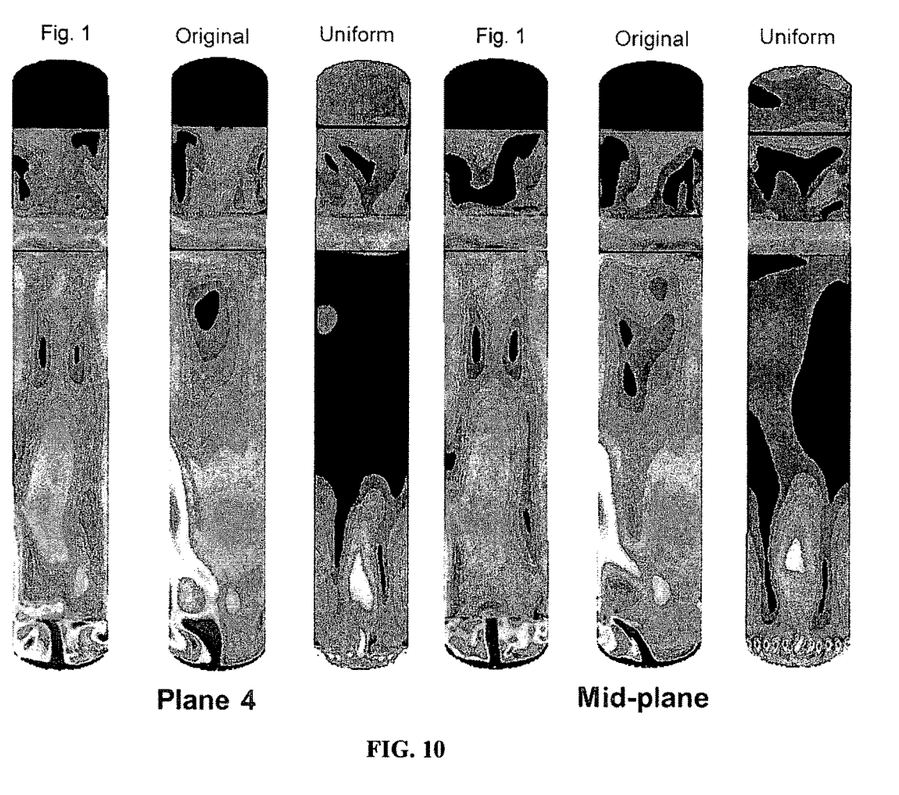
FIG. 10 shows the velocity contour on horizontal planes according to the CFD model.

FIG. 10 shows the velocity contour on horizontal planes. The original version shows higher velocities in the bulk compared to design according to FIG. 1. A higher velocity jet can also be seen at the bottom of the vessel in original design which could lead to re-entrainment of settled particles. For uniform flow distribution much lower velocities can be seen in the bulk compared to even the design according to the invention as shown in FIG. 1. Uniform flow distribution along with calming baffle should result in much improved particle settling behavior. Higher velocities in bulk reduced by calming baffle Uniform flow through the distributor calms down flow in bulk significantly.

Figure 11:
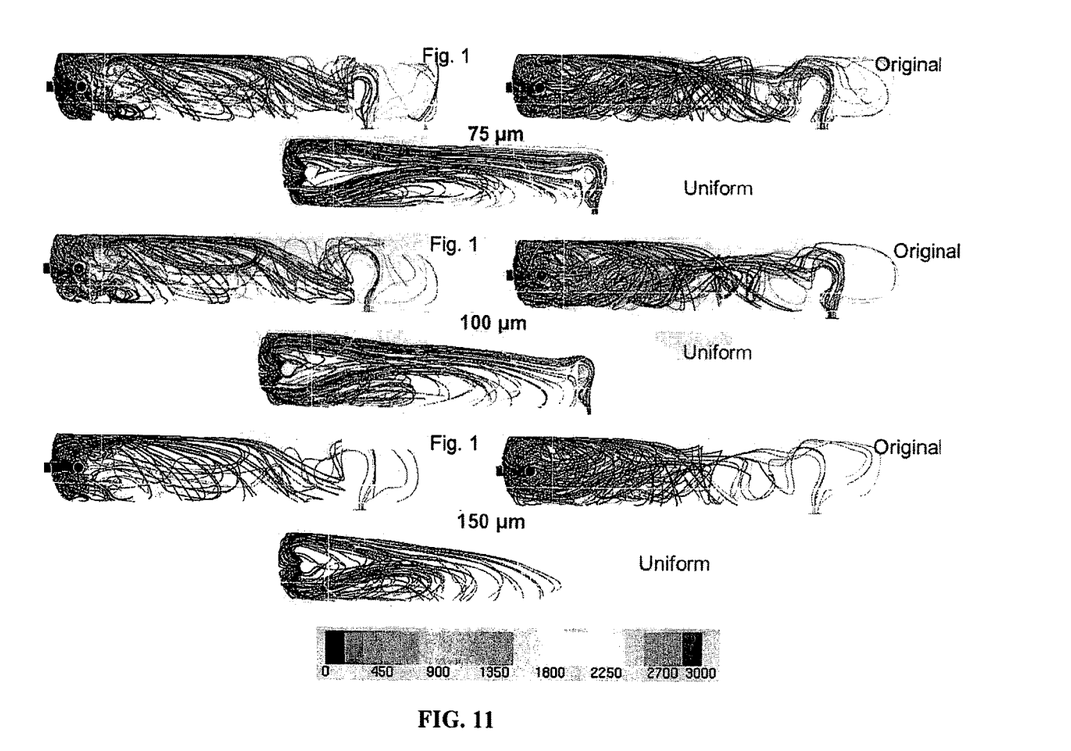
FIG. 11 shows particle settling behavior colored by residence time according to the CFD model.

FIG. 11 shows the particle settling behavior colored by residence time. These results show that a calming baffle leads to faster settling of particles. Flow back-mixing is shown to be significantly reduced while particle settling is improved by uniform flow.

The results show that introduction of calming baffles reduces velocity in the bulk thereby increasing particle settling efficiency. Benefits of calming baffle are conservatively predicted since particle re-entrainment for original case and particle settling before the calming baffle for recommended design not accounted for in the model described above. Larger size of slots in calming baffle would reduce also fouling. There is a huge mal-distribution of flow through the inlet distributor found.

The improved design of the distributor according to the invention significantly improves separator performance. For example, the cross sectional area of pipe distributor can be varied. The number of rectangular slots may also be increased according to embodiments of the invention. Also, different areas for inlet slots may also be used according to the invention.

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

The invention claimed is:

1. A quench water separator comprising:
    a shell;
    a feed calming compartment, the feed calming compartment adapted to receive feed flowing into the quench water separator and to reduce eddies in the feed, the feed calming compartment extending from one end of the shell to a calming perforated baffle, the calming perforated baffle extending across at least a third of the internal cross-sectional area of the shell;
    a tar drainage compartment adapted to separate coke/tar from fluid flowing into the tar drainage compartment from the feed calming compartment, the feed calming compartment being separated from the tar drainage compartment by the calming perforated baffle;

a quench water compartment; and a process condensate compartment adapted to separate process condensate from fluid flowing into the process condensate compartment from the quench water compartment, the quench water compartment being separated from the process condensate compartment by a perforated baffle.

2. The quench water separator of claim 1, further comprising:

wherein the quench water compartment is adapted to separate quench water from fluid flowing into the quench water compartment from the tar drainage compartment, the tar drainage compartment being separated from the quench water compartment by a coke retention baffle.

3. The quench water separator of claim 2, wherein the calming perforated baffle is located at distance "x" from a corner of the quench water separator that is closest to a feed inlet and a ratio of the length of the quench water separator 10 ("l")/"x" is between 65/2.5 to 65/3.5.

4. The quench water separator of claim 1, wherein at least the lower 1/10th of the calming perforated baffle has no perforations.

5. The quench water separator of claim 1, further comprising:

a boot leading from the feed calming compartment for collecting coke/tar material.

6. The quench water separator of claim 1, wherein the calming perforated baffle comprises holes and overhangs leading from the holes.

7. The quench water separator of claim 6, wherein the holes comprise holes having a diameter in a range of 25 to 30 mm.

8. The quench water separator of claim 6, wherein the holes comprise holes that are rectangular and have a length in a range of 200 mm to 700 mm and a width in a range of 50 mm to 200 mm.

9. The quench water separator of claim 6, wherein the area of the holes is 30% to 50% of the total area of the calming perforated baffle.

10. The quench water separator of claim 1, wherein the ratio of internal diameter of the quench water separator/height of the calming perforated baffle is in a range of 1.5/1 to 2.5/1.

11. The quench water separator of claim 1, wherein the calming perforated baffle is located at distance "x" from a corner of the quench water separator that is closest to a feed inlet and a ratio of the length of the quench water separator 10 ("l")/"x" is between 65/2.5 to 65/3.5.

12. A quench water separator comprising:

a shell;

a feed calming compartment, the feed calming compartment adapted to receive feed flowing into the quench water separator and to reduce eddies in the feed, the feed calming compartment extending from one end of the shell to a calming perforated baffle, the calming perforated baffle extending across at least a third of the internal cross-sectional area of the shell;

a tar drainage compartment comprising an outlet to separate coke/tar from the fluid flowing into the tar drainage compartment from the feed calming compartment, the feed calming compartment being separated from the tar drainage compartment by the calming perforated baffle;

a quench water compartment; and a process condensate compartment comprising an outlet to separate process condensate from fluid flowing into the process condensate compartment from the quench water compartment, the quench water compartment being separated from the process condensate compartment by a perforated baffle.

13. The quench water separator of claim 12, further comprising:

a pyrolysis gasoline compartment adapted to separate pyrolysis gasoline from fluid flowing into the pyrolysis gasoline compartment from the process condensate compartment, the pyrolysis gasoline compartment being separated from the process condensate compartment by a spillover baffle.

14. A method of separating coke/tar from quench water in a quench water recycling loop, the method comprising:

receiving furnace effluent in a quench tower;

quenching the furnace effluent in the quench tower with quench water to produce at least a bottom stream comprising pyrolysis gasoline; and settling the bottom stream comprising pyrolysis gasoline in a quench water separator according to claim 1.

15. The method of claim 14, wherein at least the lower 1/10th of the calming perforated baffle has no perforations.

16. The method of claim 14, further comprising:

flowing coke/tar from the quench water separator via a boot leading from the feed calming compartment.

17. The method of claim 14, wherein the calming perforated baffle comprises holes with overhangs leading from the holes.

18. The method of claim 14, wherein the area of the holes is 30% to 50% of the total area of the calming perforated baffle.

19. The method of claim 14, wherein the ratio of internal diameter of the quench water separator/height of the calming perforated baffle is in the range 1.5/1 to 2.5/1.

20. A method of separating coke/tar from quench water in a quench water recycling loop, the method comprising:

receiving furnace effluent in a quench tower;

quenching the furnace effluent in the quench tower with quench water to produce at least a bottom stream comprising pyrolysis gasoline; and settling the bottom stream comprising pyrolysis gasoline in a quench water separator according to claim 12.

* * * * *